F. H. WHITE.
SCREW DRIVER.
APPLICATION FILED JAN. 27, 1917.
1,271,816.
Patented July 9, 1918.
2 SHEETS—SHEET 1.
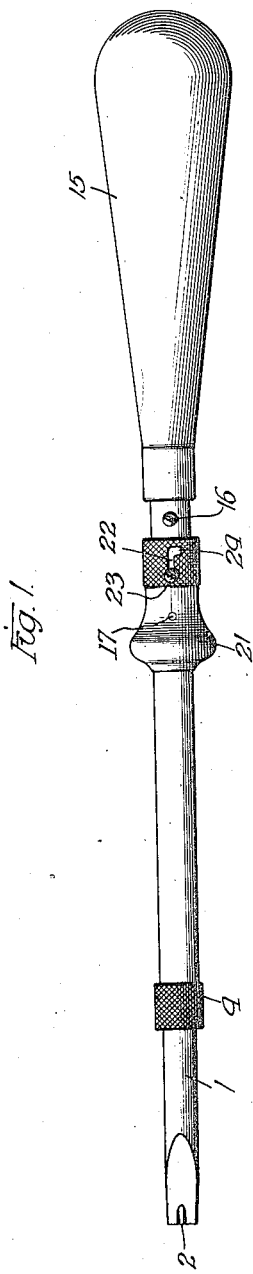
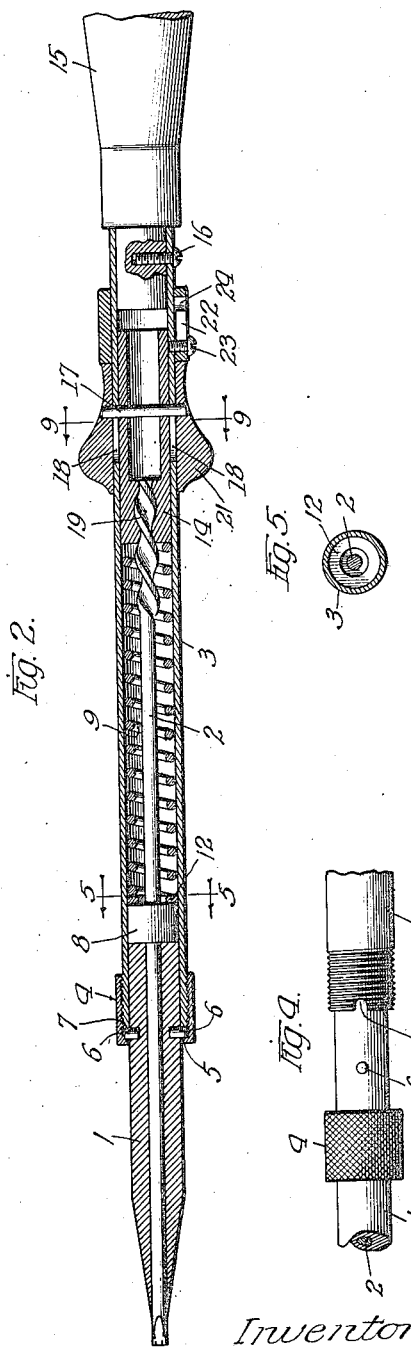
Inventor
Frederick H. White
By Cheever & Cox
Attys.

F. H. WHITE.
SCREW DRIVER.
APPLICATION FILED JAN. 27, 1917.
1,271,816.
Patented July 9, 1918.
2 SHEETS—SHEET 2.
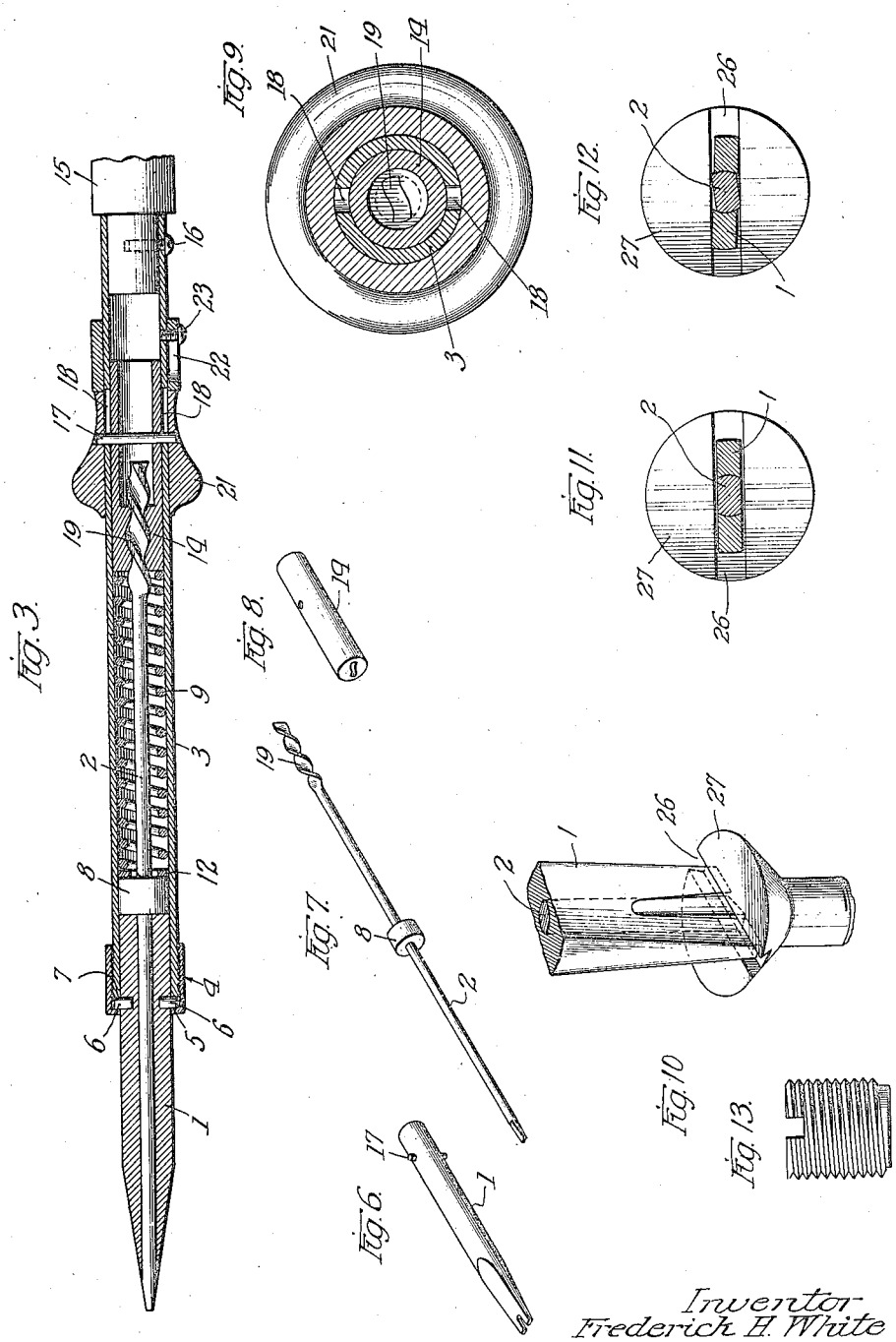
Inventor
Frederick H. White
By Cheever & Cox
Attys

UNITED STATES PATENT OFFICE.

FREDERICK H. WHITE, OF NEW YORK, N. Y.

SCREW-DRIVER.

1,271,816.

Specification of Letters Patent.

Patented July 9, 1918.

Application filed January 27, 1917. Serial No. 144,822.

*To all whom it may concern:*

Be it known that I, FREDERICK H. WHITE, a citizen of the United States, residing at New York city, in the county and State of New York, have invented a certain new and useful Improvement in Screw-Drivers, of which the following is a specification.

My invention relates to screw drivers, and the object of the invention is to provide a screw driver capable of gripping the screw so that the operator will not have to hold the screw in his fingers or lend any assistance with his fingers while the screw is being started. According to my invention, the screw is held by engaging it within the screw slot in distinction to engaging the sides of the screw or screw head. As contributory to the principal object, it is my purpose also to provide means whereby the screw driver may be readily converted from a retaining or holding screw driver to one operating after the manner of an ordinary plain screw driver. Various advantages of construction and function will become apparent as the description proceeds.

I accomplish my objects by the mechanism illustrated in the accompanying drawings, in which one form of my invention is shown. In these drawings—

Figure 1 is a side view of the screw driver.

Figs. 2 and 3 are longitudinal sections thereof showing the operating parts in different positions.

Fig. 4 is a detail view illustrating one method of connecting the point to the casing.

Fig. 5 is a sectional view on the line 5—5, Fig. 2.

Fig. 6 is a perspective view of the point.

Fig. 7 is a perspective view of the rotary gripping rod.

Fig. 8 is a perspective view of the traveling nut which rotates the retaining member.

Fig. 9 is an enlarged cross section on the line 9—9, Fig. 2.

Fig. 10 is an enlarged perspective illustrating the manner in which the screw driver engages the screw.

Fig. 11 is a view in the nature of a diagram showing the manner in which the screw driver enters the screw slot when the screw driver is converted to the condition of an ordinary screw driver.

Fig. 12 is a view illustrating the manner in which the screw driver engages the sides of the screw slot when the screw driver is operating in accordance with my invention.

Fig. 13 is a side view of a headless screw which is of a well known type and which may be engaged by my screw driver as readily as if it had an enlarged head as in the screw shown in Fig. 10.

Similar numerals refer to similar parts throughout the several views.

In the form which I have chosen to illustrate the principle of the invention, the point 1 of the screw driver is longitudinally bored to receive the rotatable member 2. The point is wedge-shaped at the acting end as in the ordinary screw driver, and the acting end of the rotatable member 2 (which for convenience may be referred to as the " gripping rod ") is also wedge-shaped, so that when the gripping rod is rotated to normal position, flatwise with the point, the two parts together will form the equivalent of the point of an ordinary screw driver. In other words, the two parts are complementary at the acting end.

The point 1 is secured to the shell or casing 3 by a coupler 4, shown in detail in Fig. 4. This is preferably knurled on the outside to enable it to be more readily gripped. It is internally threaded to screw onto the externally threaded lower end of the casing 3, and has an inwardly turned annular flange 5 at the lower end which engages the pins 6, 6 fastened to the point 1. Said pins fit into the notches 7, formed in the end of the casing 3 as best shown in Fig. 4. This makes a rigid coupling for detachably fastening the point to the casing, although it will be understood that other forms of coupling may be substituted.

A collar 8 is rigidly fastened to the gripping rod between its ends and bears against the inner end of point 1, thus permitting the rod to rotate but always holding the outer end of the rod flush or coterminate with the outer end of the point 1. A helical compression spring 9 encircles rod 2 and bears at one end against a washer 12, which in turn bears against the collar 8. The other end of spring 9 bears against the traveling nut 14 and urges it toward the handle 15. Said handle may assume any suitable form and is here shown to be attached to the upper end of the casing 3 by suitable means of the screw 16. Nut 14 is slidable within the casing but is prevented from turning by a pin 17 which passes through and slides in the longitudinal slots 18 in casing 3. A helix 19 is formed on rod 2 within the casing and this works within a corresponding internal thread in nut 14. The parts are so constructed that when the nut travels longitudinally in the casing, it will rotate the rod. As spring 9 constantly urges the nut inward (toward the handle) it follows that there is a constant tendency of the gripping rod to rotate so long as the nut is free to move inward.

The nut may be locked in its outward position by means of a sliding sleeve 21 which slides upon the outside of the casing 3 and engages the projecting ends of the pin 17. Sleeve 21 has a longitudinal slot 22 which accomodates a stop-pin 23. There is a notch 24 at the inner end of slot 22 so that when the sleeve 21 is slid inward as far as it will go and given a slight turn so that the notch will engage pin 23, the sleeve will be locked; hence the nut will be prevented from sliding in the casing and the gripping rod will be prevented from rotating. Under these conditions the outer end of the gripping rod will be in normal position, flatwise with the outer end of point 1, and the screw driver will have the characteristics of an ordinary screw driver. When pin 23 is disengaged from the notch 24, sleeve 21 is free to slide inward toward the handle and the force of spring 9 will tend to rotate the gripping rod.

In operation, let it be assumed that it is desired to take advantage of my invention and permit the gripping rod to grip the screw and to hold it preparatory to being started. The operator will force the sleeve outward as far as it will go, at which time the outer end of the gripping rod will lie flatwise with the outer end of the point 1. At this time the spring 9 will be compressed and exert considerable pressure upon the nut to force it inward toward the handle. While holding the sleeve in this position, the operator inserts the point of the tool into the slot 26 of the screw head 27, as shown in Fig. 11, or it may be inserted in the slot 30 in headless screw 31, shown in Fig. 13. When the tool is bottomed in the screw slot, the operator releases the sleeve 21, which permits the spring to force the nut inward until it has rotated the gripping rod 2 as far as the width of the slot will permit. The condition illustrated in Fig. 12 then obtains the corners of the rod gripping the sides of the screw slot and causing the corners of the point 1 also to grip the sides of the slot. The tenacity with which the tool will grip the screw under these conditions is remarkable. With a spring weak enough to permit the sleeve 21 to be readily manipulated by the fingers of the user, the screw will be gripped so firmly that it will stay securely in position and enable the operator to start the screw without holding onto it with his fingers.

While the tool is useful in many situations and under many conditions, it is of especial advantage in connection with machine screws of various types, by which I mean screws intended to hold metallic parts together. As a few examples, I would mention the case of machinists who frequently have occasion to assemble and disassemble parts of their machines; also machine erectors. The utility of my tool is especially noteworthy in cases where headless screws are employed. For example, the type of screw illustrated in Fig. 13. This type is often used by jewelers, watchmakers, moving picture machine operators and others. It is quite common to have headless screws of this character which are so small that it is almost impossible to start them with the fingers. By using a screw driver of my construction, the screw may be readily applied to the screw driver where it will be firmly held and will remain until it has been screwed completely home.

By preference, I so design the parts that the gripping rod will tend to force the end of the point 1 against the same side of the screw slot as will be engaged in screwing the screw into the threaded object. This condition is illustrated in Fig. 12, it being understood that the view is taken looking down on the top of an ordinary, right handed screw.

While the proportion of the parts may be varied, I have found that it is suitable for most cases to make the width of the gripping rod equal to about one-fourth of the total width of the end of the point 1. That is to say, the diameter of the gripping rod may appropriately be about one-quarter of the diameter of the point 1. This gives the gripping rod abundant opportunity to securely grip a screw within the proper range of the tool, and at the same time leaves sufficient metal in the point to give it practically the full strength that it would have if entire; for it will be noted that in my screw driver the material for the gripping rod is removed at the center of the rod, whereas the pressure of the screw driver upon the sides of the screw slot is chiefly at the extremities.

If the gripping feature of my screw driver is temporarily not wanted, the operator merely slides sleeve 21 as far outward toward the point as it will go, and then gives it a slight rotation so as to bring the pin 23 into notch 24. The gripping rod will then be prevented from rotating and the screw driver will operate in the non-gripping manner of an ordinary screw driver.

A screw driver embodying my invention may be employed in connection with a wide range of sizes of screws, the only limit being that the width of the screw slot shall be slightly less than the diameter of the gripping rod.

It is common practice, when screw drivers become worn at their acting ends, to touch them up by filing. It will be noted that this practice may be followed with my screw driver, also, because as the acting ends are filed away there is always plenty of stock left both in the point 1 and in the gripping rod and as these parts both have constant cross section the acting ends will always be complementary.

Another advantage of my screw driver is that the gripping action is substantially uniform for all widths of the screw slot. This is due to the joint action of the spring and the cam-like helix. The helix differs from the thread of an ordinary screw or bolt in that the pitch is very coarse; that is to say, the turns are comparatively far apart, thus producing a cam-like surface and enabling the traveling nut to rotate the center rod 2 by merely pushing the nut lengthwise in the casing 3. In the ordinary bolt, of course, rotation can be produced by merely pushing longitudinally upon the nut. In my device, the spring exerts a substantially constant pressure upon the traveling nut and hence there is a substantially constant rotary pressure of the central gripping rod upon the sides of the screw. Thus, my device is distinguished from devices in which a ratchet is employed or in which gripping engagement is produced by means of a nut having an ordinary screw thread.

Having thus described my invention, what I claim as new and desire to secure by Letters Patent, is:—

1. A screw driver having a point entering the screw slot, a rotatable member also entering said slot, and a spring for urging said rotatable member to rotate relatively to the screw driver point whereby the spring furnishes the force which creates the gripping action on the screw.

2. A screw driver having a rotatable gripping rod, a point longitudinally chambered for housing said rod, a helix connected to said rod for rotating it, a nut coacting with said helix for rotating it, a casing wherein the nut slides, and a spring for causing said nut to slide in the casing to thereby rotate the helix and gripping rod.

3. A screw driver having a casing, a point attached in said casing and having a longitudinal bore, a gripping rod journaled in said bore and having a helix at the inner portion, a non-rotating nut traveling in said casing along said helix to cause the rod to rotate, and means for moving said nut along said helix.

4. A screw driver having a casing, a point attached to said casing and having a longitudinal bore, a gripping rod journaled in said bore and having a helix at the inner portion, a nut traveling in said casing along said helix to cause the rod to rotate, and a guide adapted to prevent said nut from rotating but permit it to travel lengthwise of said helix.

5. A screw driver having a casing, a point attached to said casing and having a longitudinal bore, a rotatable gripping rod passing inward through said bore, said rod having a projection bearing against the inner end of said point to prevent it from moving outward, a helix on said rod, a non-rotary nut traveling in said casing and coöperating with said helix to cause the rod to rotate, and a spring operative upon said nut and upon said projection for urging said nut to travel in a direction which rotates the rod to grip in the slot.

6. A screw driver having a tubular casing, a point fastened thereto and extending outward therefrom said point having a central bore, a gripping rod having an outer end substantially co-terminate with said point, a coarse-pitch helix in said casing for rotating said rod, and a non-rotating nut traveling in said casing for operating said helix.

7. A screw driver having a coterminate point and gripping rod, a casing fastened to the inner end of said point, a helix in said casing for rotating said rod, a non-rotating nut traveling in said casing for operating said helix, and a sleeve movable lengthwise of said casing for moving said nut lengthwise of the casing.

8. A screw driver having a tubular casing, a point extending outward therefrom, and having a central bore, a gripping rod passing through said bore, and provided with a helix within the casing, a non-rotatable nut traveling within the casing and coöperating with the helix, a spring for urging said nut in one direction, and means for locking said nut against movement under the influence of the spring.

9. A screw driver having a tubular casing, a point extending outward therefrom, and having a central bore, a gripping rod passing through said bore and provided with a helix within the casing, a non-rotatable nut traveling within the casing and coöperating with the helix, a spring for urging said nut in one direction, and a sleeve sliding on the outside of said casing and connected to the nut for controlling it longitudinally of the helix.

10. A screw driver having a tubular casing, a point extending outward therefrom and having a central bore, a gripping rod passing through said bore and provided with a helix within the casing, a non-rotatable nut traveling within the casing and coöperating with the helix, a spring for urging said nut in one direction, a sleeve sliding on the outside of the casing, said casing having a longitudinal slot adjacent to the sleeve, and a pin fastened to the nut and to the sleeve and passing through said slot whereby the sleeve and the nut move in unison, and the nut is prevented from rotating.

11. A screw driver having a longitudinally bored point, a tubular casing fastened thereto, a gripping rod passing through said bore and being substantially coterminate with said point at the outer end, a helix for rotating said rod, a non-rotatable nut traveling in said casing for operating said nut, a spring acting upon said rod and said nut to exert force longitudinally, a sleeve for controlling said nut, and a projection on said casing, said sleeve having a slot with a notch at one end for locking said sleeve against longitudinal movement.

12. A screw driver having a casing, a point fastened to said casing and being longitudinally bored, a gripping rod passing through the bore in said point, a helix for rotating said rod, the turns of the helix being comparatively far apart, a nut traveling in said casing for operating said helix, and means for causing said nut to travel, the acting end of the rod being symmetrical with the acting end of the point, whereby, when the rod is rotated to normal position, the acting end of the tool will have the appearance of an ordinary screw driver.

13. A screw driver having a casing, a point which is longitudinally bored attached to said casing, a gripping rod passing through the bore in said point, a helix for rotating said rod, a non-rotatable nut traveling in said casing for operating said helix, a spring for urging said nut away from normal position, and a longitudinally movable element for controlling the nut as against the force of the spring, the acting end of the point and of the gripping rod being symmetrical, whereby, when the rod is in normal position, the acting end of the tool will appear as an ordinary screw driver.

In witness whereof, I have hereunto subscribed my name.

FREDERICK H. WHITE.